UNITED STATES PATENT OFFICE.

ERNEST DEACON BELL, OF LONDON, ENGLAND, ASSIGNOR TO JOHN ABLETT, OF LONDON, ENGLAND.

CHEESE-PASTE AND METHOD OF MAKING SAME.

SPECIFICATION forming part of Letters Patent No. 685,664, dated October 29, 1901.

Application filed December 10, 1900. Serial No. 39,408. (No specimens.)

*To all whom it may concern:*

Be it known that I, ERNEST DEACON BELL, a subject of the Queen of Great Britain and Ireland, residing at London, England, have invented new and useful Improvements in Alimentary Preparations, of which the following is a full and accurate description.

My invention has for its object the production of a food preparation which shall be rich in flavor and in nutriment and easily digestible.

Cereals and cheese blended in various ways form pleasant and favorite dietetic combinations, but they labor under certain disadvantages. Cheese as it is commonly used is not only indigestible, but the fullness of flavor of which it is capable is not developed, and, furthermore, the starch of the cereals with which it is usually eaten, owing to imperfect preparation, is likely to create flatulence and other disorders.

My invention is a combination of cereals and cheese so prepared as to avoid these undesirable conditions and effects. The cereals are treated in a digester, so as to convert the starch into dextrin, which is easily digested, and the cheese prepared with alkali, whereby it is not only enriched in flavor, but made readily digestible, owing to the conversion of the coagulated casein into the soluble form of alkali-albumen.

In carrying my invention into practice I take cereals, preferably rice, oats, wheat, and its derivatives, such as macaroni, either singly or in combination, and if used in the state of flour or meal make them into a paste with an approximately equal quantity of water. If the cereals, however, are used in the state of grain, they are soaked for some hours in water, so as to soften them by imbibition of the liquid. In the case of macaroni the material is put into boiling water for about half an hour, or until it swells and grows tender. In any case after treatment with water the moistened cereals are put into a digester and heated under pressure not exceeding three atmospheres to a temperature not exceeding 134° centigrade, but preferably at a pressure of about two atmospheres, giving a temperature of about 121° centigrade, for an hour or more, according to the amount of dextrinization desired. Under the combined influence of moisture and high temperature the starch of the cereals becomes converted into dextrin and is then easily digestible. At the conclusion of this process the dextrinized cereals are removed from the digester and cheese-paste prepared in the following manner is added to them: Cheese cut into small pieces is passed through rollers, crushed to a soft broken mass, and made into a paste by adding an approximately equal quantity of water or milk, preferably milk. The liquid added should contain alkali, preferably in the form of potash or soda carbonate or bicarbonate, to the extent of about one and a half per cent. the weight of cheese. Butter should then be added to the alkalized cheese-paste to the extent of about one-half the weight of cheese. Flavoring substances—especially truffles, tomatoes, nutmeg, pepper, mustard, &c.—may be introduced to taste. This alkalized cheese mixture is then added to the dextrinized cereals in any desired proportion. One part of the former to two parts of the latter or two parts of the former to three parts of the latter give excellent results. The cereal-cheese mixture is then cooked over a slow fire for from half an hour to an hour. During this time the cheese dissolves in the alkaline medium and becomes easily digestible and at the same time develops a very rich flavor. At the conclusion of this cooking the preparation may be considered finished; but if desired still richer eggs well beaten up may be added to the extent of about one-half the weight of cheese used and the mixture cooked again for about half an hour over a somewhat quicker fire that the first, when it will be completed. It may then either be used at once, or it may be put up in tins, jars, bottles, or other receptacles or in edible skins in the convenient manner of sausages. The preparations which result from these methods are much superior to the ordinary preparations of cereals and cheese, whether in flavor or in digestibility. They may be freely used by persons who could not use ordinary cheese or its combinations without risk of indigestion.

The proportions of butter, eggs, and cheese employed admit of variation.

I claim—

1. The product produced by the herein-described process, consisting of a cooked cheese-paste containing dextrinized cereals, the casein being in the soluble form of alkali-albumen, substantially as specified.

2. The process of obtaining a cooked cheese-paste containing dextrinized cereals which consists of the following steps, the softening of the cereals with water; heating them in a digester under pressure for a suitable time so as to convert their starch into dextrin; adding alkalized cheese-paste to the dextrinized cereals; and cooking the cheese-paste with the cereals for a suitable time over a slow fire.

3. The process of obtaining a cooked cheese-paste containing dextrinized cereals which consists of the following steps, the softening of the cereals with water; heating them in a digester under pressure for a suitable time so as to convert their starch into dextrin; adding alkalized cheese-paste to the dextrinized cereals; cooking the cheese-paste and cereals over a slow fire until the cheese is completely dissolved; removing from the fire and incorporating eggs; and cooking the paste a second time.

In witness whereof I have signed this specification in presence of two witnesses.

ERNEST DEACON BELL.

Witnesses:
A. STEAD,
J. PHILLIPS CRAWLEY.